June 14, 1949.  T. H. LJUNGGREN ET AL  2,473,380
COMBINATION DIAPHRAGM AND CLAMP CHUCK
Filed April 10, 1947
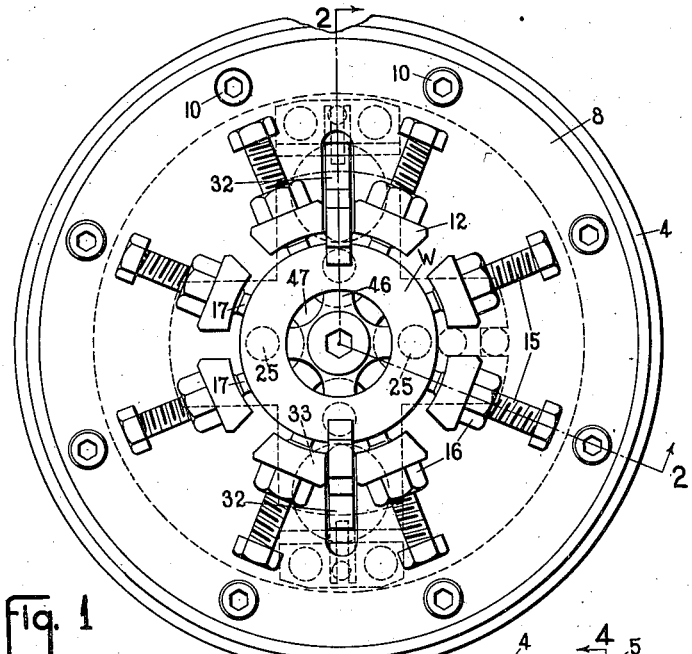
Fig. 1
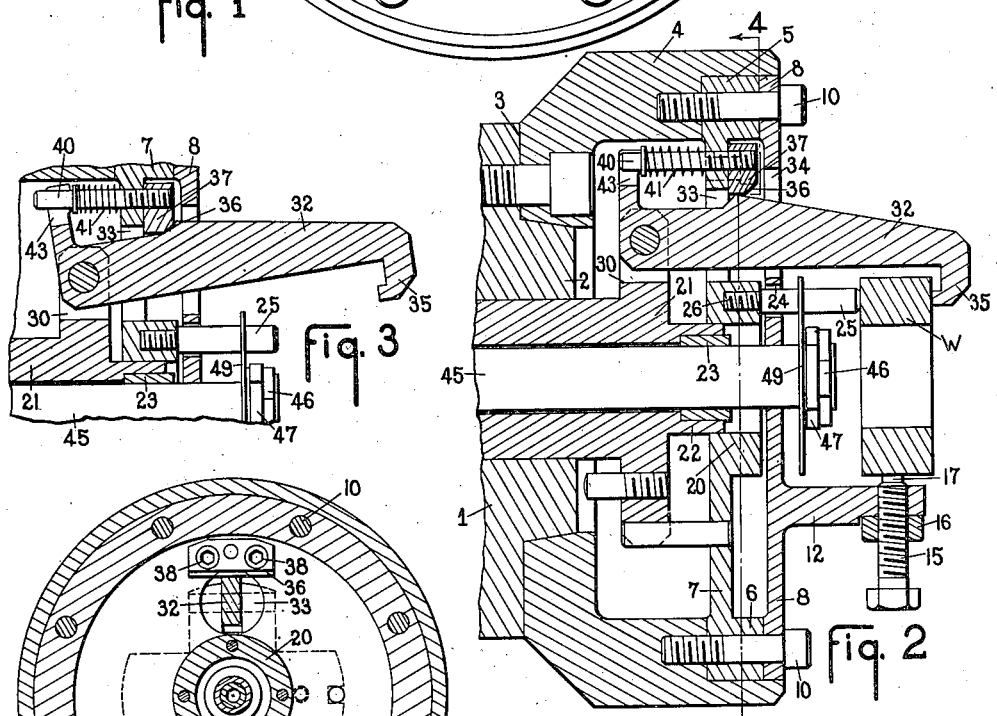
Fig. 3
Fig. 2
Fig. 4
INVENTORS
Thor H. Ljunggren
Glenn M. Green
by
Wright Brown Quinby & May
Att'ys Patented June 14, 1949

2,473,380

UNITED STATES PATENT OFFICE 2,473,380

COMBINATION DIAPHRAGM AND CLAMP CHUCK

Thor H. Ljunggren and Glenn M. Green, Springfield, Vt., assignors to Bryant Chucking Grinder Company, Springfield, Vt., a corporation of Vermont Application April 10, 1947, Serial No. 740,642

7 Claims. (Cl. 279—46)

This invention relates to chucks for holding work pieces, and more especially to chucks of the diaphragm type, and has for an object to so modify a chuck of this type that it can be used successfully for holding work which is to be internally ground while being rotated at relatively high speed, and where the size of the hole is to be tested by the use of a plug gage.

In the usual diaphragm chuck the work piece is held by the tension of fingers projecting from the forward face of the diaphragm, the work piece being released by flexing the diaphragm by exerting outward axial pressure on its central portion, this separating the fingers. Such a chuck is satisfactory when the speeds of rotation are not too high and when the work piece is pressed back against a stop with due care. More recently, however, it has been found desirable in many instances to speed up the rotation of the work spindle, and under such conditions, even if centrifugal force acting on the work-engaging fingers does not actually open the chuck or measurably spread the fingers, it is possible that vibrations set up under resonant conditions will cause vibration of the diaphragm at high frequency, and even when this vibration is so slight as to be undetectable, the work piece is apt to move along with the tool. Such movements, even though slight, detract from accuracy of precision grinding. These results are augmented when a plug gage is employed for automatic sizing, the plug gage giving the work piece periodical light blows at its back face at each attempt to enter the hole in the work piece. Even at low speed, therefore, the conventional diaphragm chuck is not suitable when this type of sizing is employed.

In accordance with this invention the diaphragm chuck has associated therewith means for positively holding the work piece back against the stop, so that it cannot have axial motion relative to the work spindle.

A further object of the invention is to provide means actuated by the diaphragm push rod to release the holding means prior to release of the diaphragm fingers when a work piece is to be removed, and to allow the fingers to first contact with the work piece, after which the holding means automatically comes into action after a new work piece has been inserted.

For a complete understanding of this invention, reference may be had to the accompanying drawings in which Figure 1 is a front elevation of a work spindle showing a chuck embodying the invention, a ring work piece being shown in clamped position in the chuck.

Figure 2 is a sectional view on line 2—2 of Figure 1.

Figure 3 is similar to a portion of Figure 2, but showing the chuck open.

Figure 4 is a sectional view on line 4—4 of Figure 2.

Referring to the drawings, at 1 is indicated the nose of a rotary work spindle. This nose has the standard tapered portion 2 forwardly of an annular face 3 which extends transverse to the central axis of the spindle. Against this annular face 3 and surrounding the tapered portion 2 there is seated and secured to the spindle nose, a chuck body 4. This chuck body is arranged coaxial with the spindle and its forward end is internally cut away to form an annular recess 5. Within this recess is seated a thickened rim portion 6 of a disk 7 and the marginal portion of a diaphragm 8, both of which extend transverse to the spindle axis and are spaced apart, except adjacent to their margins where the diaphragm engages the rim portion 6. These parts are held in position on the body, as by means of screws 10.

The diaphragm is provided with fingers 12 extending forwardly therefrom in circular series, eight of these fingers being shown in Figure 1. At their outer ends they have threaded transversely therethrough screws 15, which may be secured in adjusted position as by lock nuts 16 threaded thereon and adapted to be tightened against the outer faces of their respective fingers 12. The inner reduced end portions 17 of the screws are shaped to engage and clamp a work piece W, herein shown as a ring, the inside surface of which it is desired to grind while the work piece is held by the chuck. The disk 7 is provided with a central hub portion 20 which forms a bearing for a sleeve 21 slidable axially therealong, this sleeve 21 having a forward reduced diameter portion 22 which bears slidably through the hub portion 20 and which may, at a central bushing 23 which projects therebeyond, engage against the rear face of the diaphragm 8, flexing the diaphragm so as to separate the forward ends of the fingers 12 and release the work piece therefrom. The diaphragm is provided with holes 24 therethrough through which extend stops 25 shown as threaded at their rear ends at 26 into the hub portion 20 of the ring. Four of these stops 25 angularly spaced about the chuck axis are shown in Figure 1.

The member 21 is provided with any desired number of outwardly extending jaws 30, two such jaws being shown arranged diagrammatically opposite to each other. These jaws are forked and between the forks are pivoted hooks 32 which extend through holes 33 through the disk 7 and through holes 34 of the diaphragm, the forward ends of these hooks being in-turned as at 35. The portions 35 may be engaged with the outer face of the work piece W, so that when the member 21 is drawn backwardly, the work piece is drawn back and pressed firmly against the stops 25.

The hooks 32 are normally pressed outwardly out of parallelism as shown in Figure 3, as far as is permitted by the engagement of an inclined shoulder 36 on each hook against a mating face on a cam block 37. Each cam block 37 is secured to the forward face of the ring 7 between this ring and the diaphragm 8, as by a pair of screws 38 which enter threaded holes in the ring 7. It may also be held in position by the forward threaded end of a post 40 which is threaded through the ring 7 and the cam block 37 and extends rearwardly of the ring 7 where it is surrounded by a coil spring 41 which bears between the rear face of the ring 7 and a forked short arm 43 extending outwardly from the rear end of a hook 32. The rear end of the pin 40 projects through the slotted extremity of the arm 43. In this position of the parts, as shown in Figure 3, a work piece may be placed between the jaws 12 and against the stops 25. The member 21 is then withdrawn, allowing the fingers 12 to bring their screws 17 into clamping engagement with the outside of the work piece, while the cam face 36 of each hook, riding down the face of the cam 37, causes the fingers 32 to be swung toward parallelism with the axis of the spindle, bringing their hooked outer ends 35 outwardly of the outer face of the work piece. As the member 21 continues its withdrawing motion, the hooks are pulled back bodily, pressing their forward ends 35 against the work and holding the work firmly against the stops 25. It will be noted that the interior bore of the work piece is free from any attaching devices and is exposed for finishing by any suitable tool such as a grinding wheel.

As before noted, the member 21 is in the form of a sleeve, and slidable through it is a gage rod 45 having at its forward end the plug gage elements 46 and 47. The element 46 is of a smaller maximum diameter than the element 47 and is intended to be sized for rough grinding work, while the larger diameter plug portion 47 is of a size to show finished work size when the hole in the work is sufficiently large for it to just enter therein. As shown in Figure 1, these elements 46 and 47 may have portions of their peripheries cut away so that they engage only at spaced portions of the inner face of the hole, and as further shown in this figure, these engaging portions of the two elements are angularly displaced from each other.

Just back of the finish gage 47, the rod 45 may be provided with a plate 49 slidably guided on the stops 25 and which may act as an ejector to push the work out from between the fingers 12 after the rod 45 has been moved forwardly sufficient to bring the finish gage plug 47 within the work piece and after the work piece has been released by forward motion of member 21.

It will be seen that during operation of the grinding wheel on the work, it is held axially between the hooks 35 and the stops 25 rigidly so that it cannot move axially with the wheel or in response to the repeated light blows of the plug gage against its back face, but the desirable centering effect of the diaphragm portion of the gage is maintained.

From the foregoing description of an embodiment of this invention it should be evident to those skilled in the art that various changes and modifications might be made without departing from its spirit or scope.

We claim:

1. In combination, a hollow spindle having a nose, a chuck comprising a body for securement coaxially to said nose, a diaphragm secured at its margin to said body and extending transverse to said axis, said diaphragm having forwardly projecting work-engaging fingers arranged in circular series, said diaphragm having openings therethrough, a member slidable through said hollow spindle, hooks pivoted to said member for swinging motion toward and from parallelism to said axis and extending through said openings, stops carried by said body and extending through said diaphragm and against which the work piece may be engaged, spring means tending to open said hooks, and cam elements on said body and hooks coacting to swing said hooks toward said axis when said member is retracted, said hooks having in-turned ends for engagement with the outer face of a work piece held between said fingers to draw said work piece backwardly against said stops as said member is retracted.

2. In combination, a hollow spindle having a nose, a chuck comprising a body for securement coaxially to said nose, a diaphragm secured at its margin to said body and extending transverse to said axis, said diaphragm having forwardly projecting work-engaging fingers arranged in circular series, said diaphragm having openings therethrough, a member slidable through said hollow spindle, hooks pivoted to said member for swinging motion toward and from parallelism to said axis and extending through said openings, stops carried by said body and extending through said diaphragm and against which the work piece may be engaged, spring means tending to open said hooks, and cam elements on said body and hooks coacting to swing said hooks toward said axis when said member is retracted, said hooks having in-turned ends for engagement with the outer face of a work piece held between said fingers to draw said work piece backwardly against said stops as said member is retracted, said member having a portion for engagement with the back face of said diaphragm for opening said fingers after said hooks have separated from forwardly of the forward face of the work piece.

3. In combination, a hollow spindle having a nose, a chuck comprising a body for securement coaxially to said nose, a diaphragm secured at its margin to said body and extending transverse to said axis, said diaphragm having forwardly projecting work-engaging fingers arranged in circular series, said diaphragm having openings therethrough, a member slidable through said hollow spindle, hooks pivoted to said member for swinging motion toward and from parallelism to said axis and extending through said openings, stops carried by said body and extending through said diaphragm and against which the work piece may be engaged, spring means tending to open said hooks, and cam elements on said body and hooks coacting to swing said hooks toward said axis when said member is retracted, said hooks having in-turned ends for engagement with the outer face of a work piece held between said fingers to draw said work piece backwardly against said stops as said member is retracted, said member having a portion for engagement with the back face of said diaphragm for opening said fingers after said hooks have separated from forwardly of the forward face of the work piece, said member being tubular, and a plug gage slidable through said member and having a gage part for entering a central hole in the work piece when said hole reaches a predetermined size.

4. In combination, a hollow spindle having a nose, a chuck comprising a body for securement coaxially to said nose, a diaphragm secured at its margin to said body and extending transverse to said axis, said diaphragm having forwardly projecting work-engaging fingers arranged in circular series, said diaphragm having openings therethrough, a member slidable through said hollow spindle, a disk carried by said body parallel to and spaced back of said diaphragm, hooks pivoted to said member for swinging motion toward and from parallelism to said axis and extending through said disk and openings, stops carried by said disk and extending through said diaphragm and against which the work piece may be engaged, spring means tending to open said hooks, and cam elements on said body and hooks coacting to swing said hooks toward said axis when said member is retracted, said hooks having inturned ends for engagement with the outer face of a work piece held between said fingers to draw said work piece backwardly against said stops as said member is retracted.

5. In combination, a spindle having a nose, a chuck comprising a body for securement to said nose, a diaphragm carried by said body and having forwardly projecting work-engaging fingers arranged in circular series, stops carried by said chuck back of said fingers and against which a work piece positioned between and gripped by said fingers may engage, and releasable means engageable with the forward end of said work piece and actuable to hold the work piece back against said stops.

6. In combination, a spindle having a nose, a chuck comprising a body for securement to said nose, a diaphragm carried by said body and having forwardly projecting work-engaging fingers arranged in circular series, stops carried by said chuck back of said fingers and against which a work piece positioned between and gripped by said fingers may engage, releasable means engageable with the forward end of said work piece and actuable to hold the work piece back against said stops, and means actuable to release said releasable means and thereafter to flex said diaphragm to release the work and to release said diaphragm to permit said fingers to grip a work piece and to then cause said releasable means to engage the work piece and press it back against said stops.

7. In combination, a hollow spindle having a nose, a chuck comprising a body for securement to said nose, a diaphragm carried by said body and having forwardly projecting work-engaging fingers arranged in circular series, stops carried by said chuck back of said fingers and against which a work piece positioned between and gripped by said fingers may engage, releasable means engageable with the forward end of said work piece and actuable to hold the work piece back against said stops, and a plug gage movable through said hollow spindle and having a gage part for entering a central hole in the work piece when said hole reaches a predetermined size.

THOR H. LJUNGGREN.
GLENN M. GREEN.

REFERENCES CITED

The following references are of record in the file of this patent:

UNITED STATES PATENTS

| Number | Name | Date |
|---|---|---|
| 1,198,612 | Bright | Sept. 19, 1916 |
| 1,812,017 | Page et al. | June 30, 1931 |
| 1,858,693 | Van Norman | May 17, 1932 |
| 1,915,005 | Schmidt | June 20, 1933 |
| 1,956,318 | Draper | Apr. 24, 1934 |
| 2,389,366 | Jones | Nov. 20, 1945 |